United States Patent [19]

Willoughby

[11] Patent Number: 5,154,361
[45] Date of Patent: Oct. 13, 1992

[54] COMMINUTION OF PLASTIC SCRAP

[75] Inventors: Michael D. Willoughby, Spring Grove, Ill.

[73] Assignee: United States Gypsum Company, Chicago, Ill.

[21] Appl. No.: 431,926

[22] Filed: Nov. 6, 1989

[51] Int. Cl.$^5$ .............................................. B02C 19/12
[52] U.S. Cl. ......................................... 241/16; 241/21
[58] Field of Search ................... 241/21, 16, DIG. 38, 241/20, 24; 209/3; 264/DIG. 69, DIG. 16; 162/4, 179

[56] References Cited

U.S. PATENT DOCUMENTS

| | | |
|---|---|---|
| 2,412,586 | 12/1946 | Knowland . |
| 2,578,523 | 12/1951 | Llewellyn . |
| 2,686,738 | 8/1954 | Teeters . |
| 3,150,834 | 9/1964 | Doyle et al. . |
| 3,756,979 | 9/1973 | Ventres et al. . |
| 3,799,454 | 3/1974 | Blackwell . |
| 4,044,107 | 8/1977 | Houghtaling ..................... 241/21 X |
| 4,067,502 | 1/1978 | Morey et al. ....................... 209/3 X |
| 4,394,498 | 7/1983 | Kastelic . |
| 4,427,157 | 1/1984 | Klein . |
| 4,625,922 | 12/1986 | Brubaker . |
| 4,950,420 | 8/1990 | Svarz .............................. 162/179 X |

FOREIGN PATENT DOCUMENTS

| | | | |
|---|---|---|---|
| 675522 | 12/1963 | Canada | .................................. 241/16 |
| 102883 | 9/1978 | Japan | ..................................... 241/16 |

*Primary Examiner*—Mark Rosenbaum
*Attorney, Agent, or Firm*—Robert H. Robinson; John M. Lorenzen

[57] ABSTRACT

A method for comminuting plastic scrap material wherein the plastic scrap is suspended in water and an antifoam agent is added to the suspension which is then passed through a disc refiner or a Valley beater to comminute the plastic scrap. The antifoam agent is selected from defoamers having an HLB value of from about 0.5 to about 10 and a polypropylene glycol having an average molecular weight of from about 900 to about 1500. The comminuted plastic scrap is useful as an additive to the core material of a gypsum wallboard.

20 Claims, No Drawings

COMMINUTION OF PLASTIC SCRAP

FIELD OF THE INVENTION

This invention relates to the reclamation of plastics which have been used or rejected in the job for which they were formed. This invention relates more particularly to the comminution of scrap so that these so-called "post-consumer" plastics may be more easily utilized again or be more easily degraded biologically. Still more particularly, this invention relates to a method for refining plastic scrap rapidly to a size suitable for use as a partial or total replacement of cellulosic pulp as a filler.

BACKGROUND OF THE INVENTION

The recycling of post-consumer plastics is expected to expand as much as ten-fold beyond the current 200 million pound per year business in less than a decade. Industrial waste recycling is and will be an even bigger business.

Accordingly, there have been many different approaches to the problem of what to do with the scrap. Some merely melt down mixtures of the plastics and mold it into useful shapes. Others classify and separate them before melting or dissolving them. Still others change the nature of the mixed plastics by chemical reaction.

An older and larger business is the recycling of newspaper and other waste paper. One problem in this business is that plastic scraps are often mixed in with the paper. Re-pulping of the paper is hampered by such scraps and their removal and disposal costs threaten the profitability of the business.

A reduction in the size of the scrap pieces facilitates melting, dissolution, and reaction. In the re-pulping of paper, some end uses of the product would permit or even benefit from the presence of comminuted plastic. One process for grinding polyethylene terephthalate (PET) bottles is limited to specific bottle designs. Another process, invented before the need for recycling became apparent and directed to the comminution of virgin plastics for use in certain applications, is taught in U.S. Pat. No. 3,150,834. There, a suspension of the plastic in water or some other non-solvating liquid that is inert to the plastic is fed between a pair of grinding surfaces, at least one of which is rotating.

In U.S. Pat. No. 2,412,586, the wet grinding of scrap rubber is taught but the use of an excessive amount of water is taught against because the formation of a slurry would reduce the grinding efficiency.

The intensive milling of a poly (arylene sulfide) in water containing a non-ionic surface active agent such as Rohm & Haas' Triton X-100 wetting agent to form a dispersion is taught in U.S. Pat. No. 3,799,454. The particle size of the plastic before being milled in a ball mill is about 30 mesh (about 24 mils) or smaller. The milling time in a ball mill is from 5 to 40 hours; use of a vibratory ball mill may reduce the time tenfold.

It is an object of this invention, therefore, to provide a quick, low-cost method for comminuting thin films or sheets of plastic.

It is a related object to provide a method for comminuting macro-sized scraps of such thin film.

It is a further related object to provide a method for comminuting a mixture of different plastics.

It is another object to provide a comminuted plastic for use as a filler.

It is another object of this invention to provide a pulp of cellulose and plastic.

BRIEF SUMMARY OF THE INVENTION

These and other objects which will become apparent from the following description are achieved by circulating a suspension of plastic scraps in water containing at least one antifoam agent selected from the class consisting of a defoamer having an HLB value of from about 0.5 to about 10 and a polypropylene glycol having an average molecular weight of from about 900 to about 1500 through a cutting machine.

DETAILED DESCRIPTION OF THE INVENTION

Plastic, as used herein, means a molded or extruded solid resin. The resin may be thermoplastic or thermosetting or elastomeric. Polyvinyl chloride, cellophane, polyethylene, polypropylene, polystyrene, polyethylene terephthalate, polycarbonate, ABS and neoprene rubber are a few examples of the plastic which may be cut up by the method of this invention. Macro-sized scraps, i.e. those having a length of about 0.5 inch or more, are suitable. Thin films or sheets, i.e. those having a thickness of about 60 mils (1.6 mils) or less, are particularly suitable. It will be evident that this invention is not limited to used plastic; it is described here with reference to plastic scraps because of its being particularly advantageous in the reclamation of such scraps. Virgin plastic may chopped up by this method for some special reason.

The cutting machine is exemplified by the Valley beater and the disc refiner, both of which are used conventionally in the wood pulp and paper industries. In both, the suspended plastic must pass between a plurality of knife edges which are in intermittent sliding contact. A short batch time of up to about 10 minutes is sufficient in the beater and average residence times of about 1 minute or less are employed in the continuous operation of a disc refiner according to this invention.

It is not understood how or why the plastic scraps are so quickly cut up by the method of this invention in contrast to the absence of any noticeable comminution of such scraps when they are circulated through a Valley beater as a suspension in plain tap water for eight hours. Within a short time after the addition of one of the above-defined antifoam agents to a fresh suspension, the scraps are reduced to a powder. The agent is exemplified by the tetramethylated decyne diol and certain ethyoxylated derivatives thereof sold by Air Products & Chemicals, Inc. under the trademark Surfynol. The effective Surfynol surfactants have a hydrophile-lipophile balance (HLB) number of about 8 or less. Other examples of the effective agents for this invention include two non-silicone-based defoamers: one is sold under the trademark Foam Blast 327 by Ross Chem, Inc. and has an HLB number between 5 and 10; the other is sold under the Nopco NXZ trademark by Henkel Corporation. A silicone emulsion sold under the trademark Dow Corning H-10 as a defoamer is also effective. A preferred antifoam agent for the purposes of this invention is a polypropylene glycol having a molecular weight of from about 900 to about 1500. This material is almost totally hydrophobic despite a hydroxyl group content of from about 2 to about 4% by weight. Nevertheless, it is sufficiently polar to affect the surface tension of water in foams and, we have discovered, to affect the surface of a plastic so that the plastic can no longer slip unscathed through a cutting machine.

A small amount of the defoamer, suitably from about 0.05% to about 1% by weight of the total aqueous suspension, is sufficient to promote the comminution of the water-wetted plastic scraps. When the plastic scraps are comminuted along with paper to form a pulp, the surfactant amounts to from about 1% to about 5% of the total weight of the suspended plastic and paper.

Waste paper such as old newspapers, kraft wrapping paper, cardboard, paper mill rejects and the like is a good source of the paper.

The following examples illustrate the invention in greater detail but are not to be taken as limitative thereof in any way. All parts and percentages are by weight unless otherwise indicated.

EXAMPLE 1

A 15% aqueous slurry of assorted waste materials consisting principally of plastic films and paper was circulated in a Valley beater and a sufficient amount of polypropylene glycol having an average molecular weight of 1200 (sold by Permethyl Corporation) was added to equal 5 parts per 100 parts of the waste material. The plastic film along with the other waste material was comminuted to fine sized particles in a short time.

EXAMPLE 2

To a suspension of 700 parts of waste material similar to that of Example 1 in 13,300 parts of water there was added 21 parts of the polypropylene glycol of Example 1. The suspension was then passed through a Beloit-Jones Double Disc #4000 refiner having 20 inch plates. A total of three passes were made in about two minutes. The slurry of finely comminuted particles was drained and pressed to remove water. The mean particle size of the product was 9 microns (0.009 mm).

EXAMPLES 3-10

Seven different defoamers were tested in an aqueous slurry containing 5% of the starting waste material of Example 2 and 3% of the defoamer, based on the weight of the waste material. The procedure of Example 1 was followed. Each of the following defoamers caused a satisfactory comminution of the plastic scraps to occur:

Ethoxylated acetylenic diol (Surfynol 440; 40% oxyethylene, HLB=8)
2,4,7,9-tetramethyl-5-decyne-4,7 diol (Surfynol 104, HLB=5)
Silicone emulsion (Dow Corning H-10)
Silicone emulsion (Dow Corning 59)
Non-silicone, non-mineral oil defoamer (Foam Blast 327, Ross Chem, Inc.)
NOPCO NXZ defoamer (Henkel Corporation)

EXAMPLE 11

Another fresh suspension like that of Comparative Example A was charged into the Valley beater and a small amount of the polypropylene glycol of Examples 1 and 2 was added. The suspension was circulated in the Valley beater for about 5 to 10 minutes and all of the plastic scraps and other waste were comminuted to a fine particle size.

EXAMPLE 12

The product of Example 2 was charged into a hydropulper along with water to give a slurry containing 3% by weight solids. The slurry was added to a calcined gypsum slurry in a mixer at a conventional gypsum board line at a rate of 6 pounds of comminuted solids per thousand square feet of half-inch board. The mixture was then sandwiched between two cover sheets of paper in the conventional manner. Four trial runs produced good board without any processing problems.

The compressive strength, nail pull strength and density of boards made during the trials and in a control run using standard refined kraft paper instead of the refined plastic are given in the following table:

|  | Control | Trial #1 | Trial #2 | Trial #3 | Trial #4 |
| --- | --- | --- | --- | --- | --- |
| Dry Density (lbs./ft$^3$) | 41.4 | 40.6 | 41.2 | 42.0 | 42.1 |
| Compressive Strength (psi) | 578 | 592 | 598 | 594 | 592 |
| Nail Pull (pounds-force) | 81 | 79 | 79 | 78 | — |

The subject matter claimed is:

1. A method for comminuting plastic scraps comprising passing a suspension of said scraps in water containing at least one antifoam agent selected from the class consisting of a defoamer having an HLB value of from about 0.5 to about 10 and a polypropylene glycol through a comminuting machine.

2. The method of claim 1 wherein the scraps are sheets of plastic.

3. The method of claim 1 wherein the scraps are macro-sized.

4. The method of claim 1 wherein the average residence time in the comminuting machine is up to about 10 minutes.

5. The method of claim 1 wherein the amount of surface active agent is from about 0.05 to about 1% by weight of the total aqueous suspension.

6. The method of claim 1 characterized further in that the aqueous suspension also contains paper.

7. The method of claim 1 wherein the antifoam agent is a polypropylene glycol having an average molecular weight of about 1200 and the amount thereof is from about 0.05% to about 1% of the total weight of the aqueous suspension.

8. A method for comminuting plastic scraps comprising passing an aqueous suspension of said scraps containing an antifoam agent having an HLB value of from about 5 to about 10 through a comminuting machine and recovering a comminuted plastic.

9. The method of claim 8 wherein the scraps are sheets of plastic having a thickness of up to about 60 mils.

10. The method of claim 8 wherein the scraps are macro-sized.

11. The method of claim 8 wherein the comminuting machine is selected from a Valley beater and a disc refiner and the average residence time for the aqueous suspension in the activated comminuting machine is up to about 10 minutes.

12. The method of claim 8 wherein the aqueous suspension also contains cellulosic fibers.

13. The method of claim 12 wherein the antifoam agent is present in the aqueous suspension in an amount ranging from about 1 to about 5% by weight of the total weight of the plastic scraps and cellulose fibers in the suspension.

14. The method of claim 8 wherein the antifoam agent is present in the aqueous suspension in an amount ranging from about 0.05 to about 1% by weight.

15. A method for comminuting plastic scraps comprising passing an aqueous suspension of said scraps containing a polypropylene glycol having an average molecular weight of from about 900 to about 1500 through a comminuting machine and recovering a comminuted plastic.

16. The method of claim 15 wherein the scraps are selected from the group consisting of plastic sheets having a thickness up to about 60 mils and macro-sized plastic pieces.

17. The method of claim 15 wherein the comminuting machine is selected from a Valley beater and a disc refiner and the average residence time for the aqueous suspension in the activated comminuting machine is up to about 10 minutes.

18. The method of claim 15 wherein the aqueous suspension also contains cellulose fibers.

19. The method of claim 18 wherein the polypropylene glycol is present in the aqueous suspension in an amount ranging from about 1 to about 5% by weight of the total weight of the plastic scraps and cellulose fibers.

20. The method of claim 15 wherein the polypropylene glycol is present in the aqueous suspension in an amount ranging from about 0.05 to about 1% by weight.

* * * * *